(No Model.)
G. W. ANDERSON.
HOUSE AND STREET LETTER BOX.
No. 465,311. Patented Dec. 15, 1891.
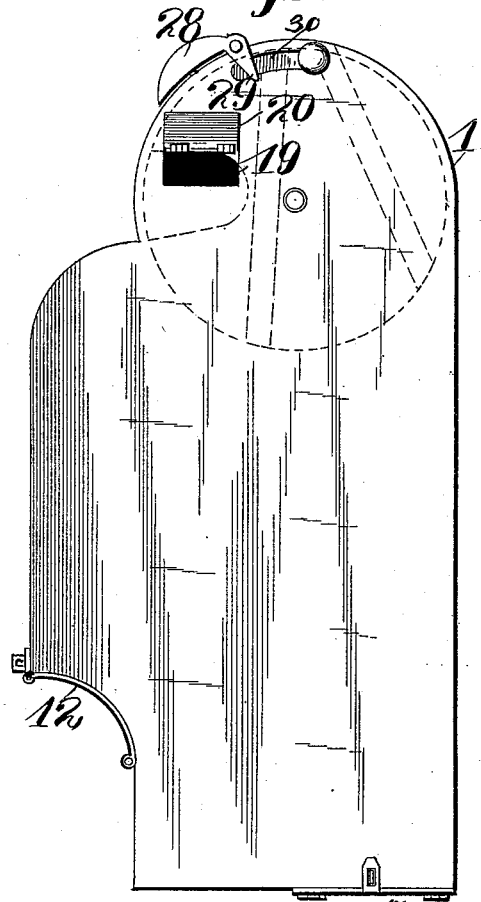
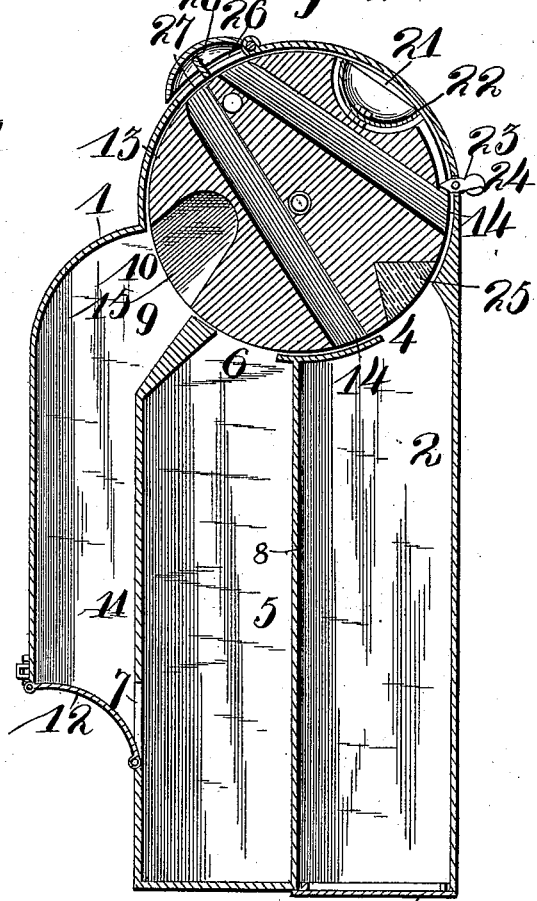
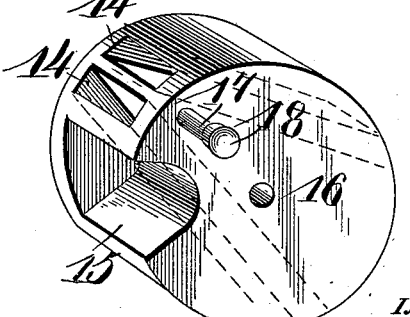
WITNESSES
INVENTOR
G W Anderson
by Higdon & Higdon
Attorneys

UNITED STATES PATENT OFFICE.

GEORGE W. ANDERSON, OF ST. LOUIS, MISSOURI.

HOUSE AND STREET LETTER-BOX.

SPECIFICATION forming part of Letters Patent No. 465,311, dated December 15, 1891.

Application filed July 2, 1891. Serial No. 398,204. (No model.)

*To all whom it may concern:*

Be it known that I, GEORGE W. ANDERSON, of the city of St. Louis, and State of Missouri, have invented certain new and useful Improvements in Letter-Boxes, of which the following is a full, clear, and exact description, reference being had to the accompanying drawings, forming a part hereof.

My invention relates to improvements in letter-boxes; and it consists in the novel arrangement and combination of parts as will be more fully hereinafter described, and designated in the claims.

In the drawings, Figure 1 is a side elevation of my complete invention. Fig. 2 is a vertical longitudinal section of the same; and Fig. 3 is a perspective view of a rotating cylinder which I employ for conveying the mail to the appropriate receptacle.

It may be prefaced that my letter-box is as equally useful for outdoors as indoors.

I will describe the use and operation and advantages of my invention in connection with the mechanical description of the same.

Referring to the drawings, 1 indicates the outer shell or casing, which is divided or partitioned off into three receptacles as follows, to wit:

2 indicates the collecting-receptacle, which is provided with a hinged lid 3, which may be locked in any suitable manner. Said lid when open swings downwardly, thereby permitting the mail in the receptacle 2 to fall out into any desired receiving-receptacle. Said receptacle 2 is also provided with an opening 4, through which mail may be inserted in the manner as will be more fully hereinafter described.

5 indicates the delivery-receptacle, which is provided with an opening 6, through which mail may be inserted in said receptacle, and with an opening 7, through which the mail may be removed from the same. The receptacles 2 and 5 are separated by means of a division-wall 8.

9 indicates a receptacle for papers, catalogues, &c., the same being provided with an opening 10, through which said papers, catalogues, &c., may be inserted in said receptacles. The receptacles 5 and 9 are separated by a division-wall 11. The lower end of receptacle 9 is open and is adapted to be closed by means of a hinged lid 12 of the construction as shown in Fig. 2. Lid 12 is hinged in any suitable and mechanical manner to the lower portion of the division-wall 11 at a point below the opening 7, and when open it leaves the opening 7 open for the insertion of the hand, and also leaves the lower end of receptacle 9 open, thereby permitting the papers, catalogues, &c., to fall and may be received in any desired collecting-receptacle. When lid 12 is closed, it simultaneously closes the opening 7, also the lower end of the receptacle 9, which can be readily perceived by referring to Fig. 2, where the construction is clearly illustrated. The lid 12 may be locked and secured by any suitable and appropriate means.

Pivotally secured in the upper or cylindrical portion of the outer shell or casing 1 in any suitable or mechanical manner is a cylinder 13, the construction of which is fully illustrated in Fig. 3. Said cylinder 13 is provided with two transverse holes 14, which are situated at angles relative to each other, and also with a U-shaped recess 15, formed in one end thereof and extending through or almost through said cylinder. Said cylinder is also provided with a hole 16, through which a rod may be passed, which answers as a pivotal bearing for said cylinder. The rod, which is adapted to pass through hole 16, is secured to the outer shell or casing 1 in any suitable and mechanical manner. Said cylinder 13 also carries a stem 17, eccentrically located in the end thereof. Said stem 17 is provided with a button 18, which answers as a handle for rotating said cylinder.

The outer shell or casing 1 is provided with an opening 19, through which papers and like mail-matter may be inserted and placed in the U-shaped recess 15. Said opening 19 may be closed by means of a lid 20, which is hinged in any suitable and mechanical manner to the outer shell or casing 1. Said cylinder 13 is provided with a recess 21, in which an alarm-bell 22 is secured in any mechanical and suitable manner, said bell adapted to be sounded by means of a pivotally-secured lug 23, the same being provided with a gravity or increased portion 24, which causes said lug to assume its normal position after being actuated by the bell. By referring to Fig. 2 it can be readily perceived that the bell 22 may be brought in contact with the pivoted lug 23 whenever cylinder 13 is rotated either to the right or left. The cylinder 13 is provided with a gravity-lug 25, which causes said cylinder to always assume a position as illustrated in Fig. 1, in which position the holes 14 are not in communication with the holes 26 and 27, through which the letters are inserted into the holes 14. Said openings 26 and 27 are adapted to be closed by means of a lid 28, the same pivotally secured to the outer shell or casing 1 in any suitable and mechanical manner. Said lid 28 is provided with an arm 29, which projects downwardly when in its normal position and is adapted to be struck by a stem 17, carried by a cylinder 13.

Having fully described the mechanical parts of my invention, I will now describe the operation of the same. For instance, if it is desired to place a letter in the collecting-receptacle 2 the operator should rotate the cylinder around so that the hole 14, adjacent to bell 22, communicates with the opening 26. Then by inserting the letter the weight of the gravity portion 25, and also the letter, will rotate cylinder 23 until said holes 14 communicate with the opening 5, in which position the letter may fall down into collection-receptacle 2. If it is desired to place the letter in the delivery-receptacle, the operator should rotate cylinder 13 by means of button 18 until the hole 14, adjacent to U-shaped recess 15, communicates with the opening 27. Then the letter may be placed in said hole and the weight thereof, in connection with the gravity-weight 25, will rotate cylinder 13 until said hole communicates with an opening 6, in which position the letters may pass into the delivery-receptacle. It may be premised in this connection that the outer shell or casing 1 is provided in its cylindrical portion with a curved slot 30, in which stem 17, carried by roller 13, may freely move. Whenever it is desired to place papers in receptacle 9, the operator should elevate lid 20, place said paper through opening 19 into the U-shaped recess 15, and then by the proper rotation of said cylinder said recess 15 may be made to communicate with the opening 11, in which position the paper may fall into receptacle 9. It may be noted in this connection that when the cylinder 13 is rotated to the left (referring to Fig. 1) for bringing the holes 14 in communication with the opening 26 of receptacle 7 stem 17 will strike arm 29 and elevate lid 28. The action of gravity will close said lid when left free. It may be noted in this connection that the holes 14 answer as conveyers for conveying the mail into its appropriate receptacle, and also that the U-shaped recess 15 answers as a conveyer for conducting the papers or pamphlets to their appropriate receptacles.

Having fully described my invention, what I claim is—

1. The combination, with a casing having letter-receiving openings and divided into compartments each of which has a receiving-opening, of a rotatable cylinder in said case interposed between the series of openings and provided with through-openings, means for rotating said cylinder to bring the apertures therein in alignment with the letter-receiving openings, and means for rotating it to bring the apertures coincident with the compartment-openings.

2. The combination, with a casing divided into open-end compartments and having letter-receiving openings, a rotatable cylinder journaled in said casing between the open-end compartments and the receiving-opening, having through-apertures normally registering with the open-end compartments, and means for rotating said cylinder to bring said apertures coincident with the letter-receiving openings.

3. The combination, with a casing having letter-receiving openings and a package-receiving opening and divided into open-end compartments, of a cylinder journaled in said casing and provided with through-apertures and a recess, means for rotating said cylinder to bring its recess and openings into alignment with the several openings in the casing, and means for rotating it to bring them into alignment with the open-end compartments.

4. The combination, with a casing having open-end compartments and receiving-openings, of a rotatable cylinder having through-openings and an operating-stem, and a lid pivoted over said openings and provided with an arm located in the path of travel of the said stem, whereby when said cylinder is rotated the stem will contact with the arm of the cover and raise the same.

5. The combination, with a casing divided into compartments and having receiving-openings, of a cylinder journaled in said casing and provided with through-apertures, a bell carried by said cylinder, and a sounder located in the path of travel of said bell.

In testimony whereof I affix my signature in presence of two witnesses.

GEORGE W. ANDERSON.

Witnesses:
 ED. E. LONGAN,
 A. A. EICKS.